US012632695B2

(12) United States Patent
Perez et al.

(10) Patent No.: US 12,632,695 B2
(45) Date of Patent: May 19, 2026

(54) ROBOTIC DEMONSTRATION RETRIEVAL SYSTEMS AND METHODS

(71) Applicant: NAVER CORPORATION, Gyeonggi-do (KR)

(72) Inventors: Julien Perez, Grenoble (FR); Theo Cachet, Grenoble (FR)

(73) Assignee: NAVER CORPORATION, Gyeonggi-Do (KR)

( * ) Notice: Subject to any disclaimer, the term of this patent is extended or adjusted under 35 U.S.C. 154(b) by 1088 days.

(21) Appl. No.: 17/351,351

(22) Filed: Jun. 18, 2021

(65) Prior Publication Data

US 2022/0402122 A1 Dec. 22, 2022

(51) Int. Cl.
| | |
|---|---|
| *G05B 19/42* | (2006.01) |
| *G05B 19/02* | (2006.01) |
| *G06N 3/04* | (2023.01) |

(52) U.S. Cl.
CPC ..... *G06N 3/04* (2013.01); *G05B 2219/50391* (2013.01)

(58) Field of Classification Search
CPC ............ G06N 3/04; G05B 2219/50391; G05B 2219/40391; G05B 19/42; G05B 19/02; B25J 9/1664; B25J 9/1674; B25J 9/1602; B25J 9/163; B25J 9/1653
See application file for complete search history.

(56) References Cited

U.S. PATENT DOCUMENTS

| | | | |
|---|---|---|---|
| 10,452,978 B2 | 10/2019 | Shazeer et al. | |
| 2020/0276703 A1 | 9/2020 | Chebotar et al. | |
| 2022/0051078 A1* | 2/2022 | Gong .................... | G06N 3/049 |
| 2022/0156573 A1* | 5/2022 | Rui ........................ | G06Q 10/10 |

FOREIGN PATENT DOCUMENTS

| | | |
|---|---|---|
| JP | 2020530602 A | 10/2020 |
| KR | 102180002 B1 | 11/2020 |
| KR | 20210069410 A | 6/2021 |

OTHER PUBLICATIONS

Chen et al., "Learning Generalizable Robotic Reward Functions from 'In-The-Wild' Human Videos" (Year: 2021).*
Zhu et al., "Robot Learning from Demonstration in Robotic Assembly: a Survey" (Year: 2018).*
Abbeel, Pieter, and Andrew Ng. "Apprenticeship Learning via Inverse Reinforcement Learning;" In *In Proceedings of the Twenty-First International Conference on Machine Learning.* ACM Press, 2004.

(Continued)

*Primary Examiner* — Kamran Afshar
*Assistant Examiner* — Steven Phung

(57) ABSTRACT

A robot system includes a selection module configured to select a stored demonstration for a robot from a database of stored demonstrations for different tasks of the robot; an encoder module of an attention model, the encoder module configured to determine a similarity value reflecting a similarity between: a user input demonstration for the robot; and the stored demonstration for the robot; and an indicator module configured to indicate whether the stored demonstration is the same as the user input demonstration and belongs to the same task based on the similarity value.

24 Claims, 15 Drawing Sheets

(56) References Cited

OTHER PUBLICATIONS

Argall, Brenna D., Sonia Chernova, Manuela Veloso, and Brett Browning. *A Survey of Robot Learning from Demonstration*, 2009.

Finn, Chelsea, Sergey Levine, and Pieter Abbeel. "Guided Cost Learning: Deep Inverse Optimal Control via Policy Optimization;" ICML 2016.

Gordo, Albert, Jon Almazán, Jerome Revaud, and Diane Larlus. "Deep Image Retrieval: Learning Global Representation for Image Search;" In *Computer Vision- ECCV 2016*, edited by Bastian Leibe, Jiri Matas, Nicu Sebe, and Max Welling, 9910:241-57. Lecture Notes in Computer Science. Cham: Springer International Publishing, 2016.

Guo, Weiwei, Xiaowei Liu, Sida Wang, Huiji Gao, Ananth Sankar, Zimeng Yang, Qi Guo, et al. "DeText: a Deep Text Ranking Framework with BERT;" ArXiv:2008.02460[Cs], Aug. 6, 2020.

Ng, Andrew Y., and Stuart Russell. "Algorithms for Inverse Reinforcement Learning;" In *In Proc. 17th International Conf. on Machine Learning*, 663-70. Morgan Kaufmann, 2000.

Nogueira, Rodrigo, and Kyunghyun Cho. "Passage Re-Ranking with BERT;" ArXiv:1901.04085 [Cs], Apr. 14, 2020.

Revaud, Jerome, Jon Almazan, Rafael Rezende, and Cesar De Souza. "Learning with Average Precision: Training Image Retrieval with a Listwise Loss;" in *2019 IEEE/CVF International Conference on Computer Vision (ICCV)*, 5106-15. Seoul, Korean (South): IEEE, 2019.

Schaal, Stefan, Auke Ijspeert, and Aude Billard. "Computational Approaches to Motor Learning by Imitation;" *Philosophical Transactions of the Royal Society B: Biological Sciences* 358, No. 1431 (Mar. 29, 2003): 537-47.

Schulman, John, Filip Wolski, Prafulla Dhariwal, Alec Radford, and Leg Klimov. "Proximal Policy Optimization Algorithms;" ArXiv:1707.06347 [Cs], Aug. 28, 2017.

Torabi, Faraz, Garrett Warnell, and Peter Stone. "Behavioral Cloning from Observation;" ArXiv: 1805.01954 [Cs], May 11, 2018.

Vaswani, Ashish, Noam Shazeer, Niki Parmar, Jakob Uszkoreit, Llion Jones, Aidan N. Gomez, Lukasz Kaiser, and Illia Polosukhin. "Attention Is All You Need;" NIPS 2017.

Yu, Tianhe, Deirdre Quillen, Zhanpeng He, Ryan Julian, Karol Hausman, Chelsea Finn, and Sergey Levine. "Meta-World: A Benchmark and Evaluation for Multi-Task and Meta Reinforcement Learning;" CoRL 2019.

Korean Office Action for corresponding Korean Application No. 10-2022-0059794 delivery date Apr. 29, 2024.

* cited by examiner

Similarity Value

Transformer Encoder Module

416

516 Similarity Module

508 Feed Forward Module

512 Addition and Normalization Module

504 Multi-Head Attention Module

Concatenation Of Demonstrations (two 6DOF End Effector Poses)

ROBOTIC DEMONSTRATION RETRIEVAL SYSTEMS AND METHODS

FIELD

The present disclosure relates to robots and more particularly to systems and methods for retrieving robotic demonstrations of tasks.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Robotic manipulation platforms are becoming affordable and connected. This way, such tools are available for use by a larger number of possible users to tackle an increasing amount of applications. In this context of broader deployment, one challenge is to allow a larger spectrum of end-users of varying skill levels to define target manipulation tasks.

Demonstration can be used as a modality for specifying tasks. This modality allows to transfer manipulation skills from human operators to robotic manipulators and reduces the burden of specifying such tasks programmatically. Meta-imitation learning may be a promising paradigm for learning a new manipulation task from a minimal amount of demonstrations.

SUMMARY

In a feature, a robot system includes: a selection module configured to select a stored demonstration for a robot from a database of stored demonstrations for different tasks of the robot; an encoder module of an attention model, the encoder module configured to determine a similarity value reflecting a similarity between: a user input demonstration for the robot; and the stored demonstration for the robot; and an indicator module configured to indicate whether the stored demonstration is the same as the user input demonstration and belongs to the same task based on the similarity value.

In further features, the indicator module is configured to indicate that the stored demonstration is the same as the user input demonstration and belongs to the same task when the similarity value is greater than a predetermined value.

In further features, the indicator module is configured to output the stored demonstration for augmenting training of a policy for the task in response to a determination that the user input demonstration belongs to the same task as the stored demonstration.

In further features, a control module is configured to actuate actuators of the robot based on the policy trained using the stored demonstration output for augmenting training of the policy.

In further features, the indicator module is configured to indicate that the stored demonstration is not the same as the user input demonstration when the similarity value is less than the predetermined value.

In further features: the stored demonstration includes a first time series of at least 6 degree of freedom (DoF) poses of an end effector of the robot; and the user input demonstration includes a second time series of at least 6 DoF poses of an end effector of the robot.

In further features, the encoder module includes a stack of 6 identical layers.

In further features, each of the six identical layers includes a first sub-layer and a second sub-layer.

In further features, the first sublayers define a multi-head attention module.

In further features, the multi-head attention module is configured to perform scaled dot product attention.

In further features, the second sublayers define a position wise fully connected feed forward network.

In further features, the six identical layers include residual connections around the first and second sub-layers.

In further features: the selection module is configured to select a second stored demonstration for the robot from the database of stored demonstrations in response to a determination that the stored demonstration is not the same as the user input demonstration; the encoder module is configured to determine a second similarity value reflecting a second similarity between: the user input demonstration for the robot; and the second stored demonstration for the robot; and the indicator module configured to indicate whether the second stored demonstration is the same as the user input demonstration and belongs to the same task based on the second similarity value.

In further features, a training module is configured to train the train the encoder module using a training dataset of demonstrations using a listwise loss.

In further features, the encoder module has a Transformer architecture.

In further features, a control module configured to determine one or more other stored demonstrations associated with the stored demonstration in response to the determination that the one or more other stored demonstrations are the same as the user input demonstration and belong to the same task.

In further features, the control module is configured to actuate actuators of the robot based on a policy trained using the one or more other stored demonstrations in response to a determination that the one or more other stored demonstrations are the same as the user input demonstration and belong to the same task.

In a feature, a method for operating a robot system includes: selecting a stored demonstration for a robot from a database of stored demonstrations for different tasks of the robot; determining, using an attention model, a similarity value reflecting a similarity between: a user input demonstration for the robot; and one or more stored demonstrations for the robot; and producing an output indicating whether the one or more stored demonstrations are the same as the user input demonstration and belong to the same task based on the similarity value.

In further features, the producing the output further includes producing an output that indicates that the one or more stored demonstrations are the same as the user input demonstration and belong to the same task when their similarity value is greater than a predetermined value.

In further features, the method further includes outputting the one or more stored demonstrations for augmenting training of a policy for the task in response to a determination that the user input demonstration belongs to the same task as the stored demonstration.

In further features, the producing the output further includes producing an output that indicates that the one or more stored demonstrations are not the same as the user input demonstration when their similarity value is less than the predetermined value.

In further features, the method further includes training the attention model using a training dataset of demonstrations and a listwise loss.

In further features, the method further includes actuating actuators of the robot using the trained policy.

In further features, the method further includes: determining one or more other stored demonstrations associated with the one or more stored demonstrations in response to the determination that the one or more stored demonstrations are the same as the user input demonstration and belongs to the same task; and actuating the actuators of the robot further based on the one or more other stored demonstrations.

In further features: the one or more stored demonstrations include a first time series of at least 6 degree of freedom (DoF) poses of an end effector of the robot; and the user input demonstration includes a second time series of at least 6 DoF poses of an end effector of the robot.

In a feature, a method for operating a robot system includes: obtaining a trained policy stored in a memory; and actuating actuators of a robot using the trained policy thereby performing a task defined by one or more user input demonstrations; and wherein the trained policy includes a trained attention model that is trained using a training dataset of demonstrations and a listwise loss, and wherein the training dataset of demonstrations, which includes the one or more user input demonstrations for the robot, and which is used to train the trained policy for actuating the actuators of the robot, is augmented with one or more stored demonstrations for the robot when the stored demonstrations are determined to be the same as the one or more user input demonstration and belong to the same task when their similarity values are greater than a predetermined value.

In a feature, a robot system includes: a means (e.g., a selection module) for selecting a stored demonstration for a robot from a database of stored demonstrations for different tasks of the robot; a means (e.g., an encoder module) for determining, using an attention model, a similarity value reflecting a similarity between: a user input demonstration for the robot; and the stored demonstration for the robot; and a means (e.g., an indicator module) for indicating whether the stored demonstration is the same as the user input demonstration and belongs to the same task based on the similarity value.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Robots can be trained to perform tasks in various different ways. For example, a robot can be trained by an expert to perform one task via actuating according to user input to perform the one task. This user manipulation of the robot to perform a task may be referred to as a demonstration. Once trained, the robot may be able to perform that task over and over.

The present application involves augmenting a set of demonstrations provided by a user during the fine-tuning step of a meta-imitation algorithm or the training step of a behavior cloning approach. Such demonstrations can be retrieved from already available demonstrations taken from basic skills or already available demonstrations of corresponding tasks. This may allow the robot to be trained to perform different tasks via a user input demonstration.

To train a robotic demonstration retrieval model, the task identification associated with each demonstration may be used as a supervision signal. A listwise ranking approach may be used and referred to as latent task matching. This may be referred to as being latent as the task identification is not specifically predicted, as in a classification approach, but may be used as a signal for similarity measurement among demonstrations. Compared to a task classification approach, the approach described herein may be more robust to the introduction of new tasks at test time.

The present application details a novel implementation of a retrieval model over robotic demonstrations based on corresponding task, such as manipulation tasks. A Transformer-based robotics arm demonstration retrieval model or another suitable type of attention module, such as a self-attention based model and/or a cross-attention model may be used. The retrieval model may be trained using listwise loss over concatenated pairs of demonstrations leveraging a task identifier associated with each demonstration.

Figure 1:
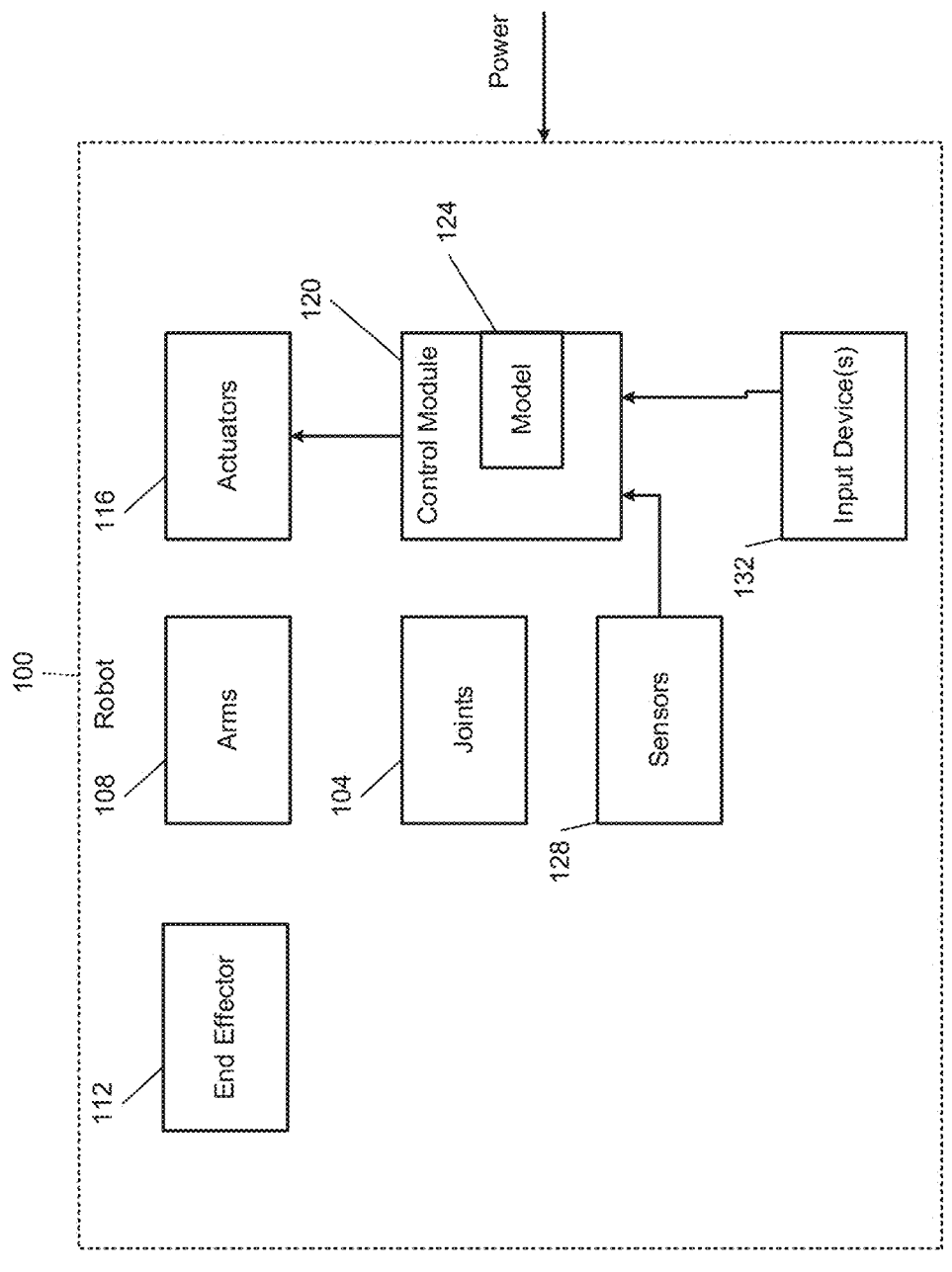
FIG. 1 is a functional block diagram of an example robot.

FIG. 1 is a functional block diagram of an example robot 100. The robot 100 may be stationary or mobile. The robot 100 may be, for example, a 5 degree of freedom (DoF) robot, a 6 DoF robot, a 7 DoF robot, an 8 DoF robot, or have another amount of degrees of freedom.

The robot 100 is powered, such as via an internal battery and/or via an external power source, such as alternating current (AC) power. AC power may be received via an outlet, a direct connection (by wire), etc. In various implementations, the robot 100 may receive power wirelessly, such as inductively.

The robot 100 includes a plurality of joints 104 and arms 108. Each arm may be connected between two joints. Each joint may introduce a degree of freedom of movement of an end effector 112 of the robot 100. The end effector 112 may be, for example, a gripper, a cutter, a roller, or another suitable type of end effector. The robot 100 includes actuators 116 that are actuated by a control module 120 in accordance with a trained policy π to actuate the arms 108 and the end effector 112. The actuators 116 may include, for example, electric motors and other types of actuation devices.

The control module 120 controls the actuators 116 and therefore the actuation of the robot 100 using a trained model 124 to perform one or more different tasks. An example of a task includes grasping and moving an object. The present application, however, is also applicable to other tasks. The control module 120 may, for example, control the application of power to the actuators 116 to control actuation. The training of the model 124 is discussed further below.

The control module 120 may control actuation based on measurements from one or more sensors 128, such as using feedback and/or feedforward control. Examples of sensors include position sensors, force sensors, torque sensors, etc. The control module 120 may control actuation additionally or alternatively based on input from one or more input devices 132, such as one or more touchscreen displays, joysticks, trackballs, pointer devices (e.g., mouse), keyboards, and/or one or more other suitable types of input devices.

The present application involves training the model 124 to determine a stored demonstration for a task that most closely matches a user input demonstration for the task. The control module 120 may make one or more adjustments to the stored demonstration or augment user input demonstrations with stored demonstrations of the task to accomplish the task.

For example, the control module 124 may receive a limited set of user input demonstrations to perform a user specified task. Once trained, using the model 124, the control module 120 may identify a stored demonstration for a task that is the same as the user specified task. The control module 120 may identify other stored demonstrations associated with the task and may use the user input demonstrations and one or more of the identified stored demonstrations to perform the user specified task. The stored demonstrations may be, for example, input previously by the user or input by other users. The stored demonstrations may be stored remotely and accessed via a network.

Figure 2:
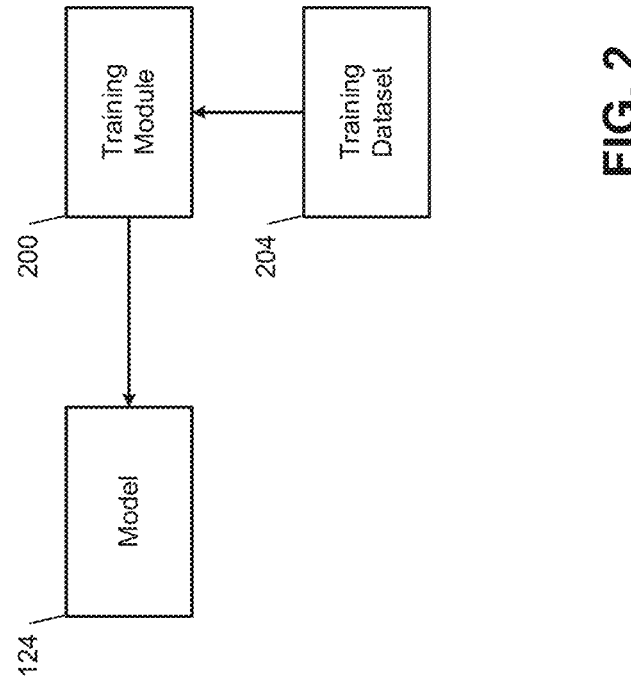
FIG. 2 is a functional block diagram of an example training system.

FIG. 2 is a functional block diagram of an example implementation of a training system. A training module 200 trains the model 124 as discussed further below using a training dataset 204. The training dataset 204 includes demonstrations for performing different training tasks, respectively. Demonstrations can be used for any number of DoF robots and can also include information regarding the state of the environment around the robot 100. The training dataset 204 may also include other information regarding performing the training tasks. Once trained, the model 124 can adapt to perform tasks different than the training tasks such as based on a user input demonstration of a task.

Robots are becoming more affordable and may therefore be used in more and more end-user environments, such as in residential settings to perform residential/household tasks. Robotic manipulation training may be performed by expert users in a fully specified environment with predefined and fixed tasks to accomplish.

Demonstrations may have advantages to specify tasks. For example, demonstrations (e.g., the training demonstrations) may be generic and can be used for multiple different manipulation tasks. Second, demonstrations can be performed by end-users, which constitutes a valuable approach for designing versatile systems.

The model 124 is a transformer-based model (based on a Transformer architecture) to enable efficient learning of end-user tasks. The training module 200 may train the model

124 using imitation learning. A goal of imitation learning may be to train a policy $\pi$ of the model 124 that can imitate the behavior expressed in the demonstrations. Two approaches to leveraging such data include inverse reinforcement learning and behavior cloning.

Behavior cloning trains a policy $\pi_\theta$ of the model 124 such as parameterized using a neural network, with parameters $\theta$ that takes the observation as input and outputs actions and uses demonstrations as a training dataset. A demonstration d is a temporal sequence of {observations; actions} tuples of successive behaviors for the task, $$d_n = [(o_1^n, a_1^n), \dots , (o_T^n, a_T^n),$$

where d is the demonstration including T data points, o is the observation at a data point, and a is the action at the data point. The training module 200 may train the model 124 to minimize the amount of supervision (data points) provided by the user through demonstrations.

The present application involves a Transformer architecture based retrieval model of robotic manipulation demonstrations based on the sequences of states taken by the robot 100. The model 124 is trained to allow augmentation of user datasets with demonstrations used during the training from the training dataset 204. This increases a likelihood of a fine tuned policy having the skills necessary to perform a user input demonstration of a task. Transformer architecture as used herein, and as used in the transformer architecture of the model 124, is described in Ashish Vaswani, Noam Shazeer, Niki Parmar, Jakob Uszkoreit, Llion Jones, Aidan N Gomez, Lukasz Kaiser, and Illia Polosukhin, "Attention is all you need", In I. Guyon, U. V. Luxburg, S. Bengio, H. Wallach, R. Fergus, S. Vishwanathan, and R. Garnett, editors, Advances in Neural Information Processing Systems 30, pages 5998-6008, Curran Associates, Inc., 2017, which is incorporated herein in its entirety. Each task can include different objects and require different skills from the policy. The tasks can be, for example, reaching, pushing, sliding, grasping, placing, etc. Each task is defined by a unique combination of required skills, and the nature and positions of objects define a task.

As stated above, the policy network of the model 124 is a Transformer-based neural network architecture. The model 124 contextualizes user input demonstrations using the multi-headed attention layers of the model 124 of the Transformer architecture. The architecture of the Transformer network allows for better capturing of correspondences between the input demonstration and the current episode/observation. The Transformer architecture of the model 124 may be helpful to process the sequential nature of demonstrations of manipulation tasks.

One goal is to train the model 124 over a pair of demonstrations based on the task of latent task matching. Assuming a training dataset D including M tasks associated with N demonstrations, $$D = d_1^1, \dots , d_N^1, \dots , d_1^M, \dots , d_N^M.$$

The similarity value (also referred to as a score or a label) associated with a pair of demonstrations may be defined $$s(d_i^\alpha, d_j^\beta) \to 0, 1$$

where 1 indicates that the two demonstrations $$d_i^{\alpha}, d_j^{\beta}$$

are the same (e.g., for the same task) and 0 otherwise (when the two demonstrations $$d_i^{\alpha}, d_j^{\beta}$$

are not the same). Determination of the similarity values is discussed further below. Generally speaking, a pair of demonstrations may be indicated as being the same when they belong to the same underlying task.

The model 124 is trained by the training module 200 using a list-wise ranking loss model to train a similarity module of the model 124, as discussed further below. This approach is robust in the demonstration retrieval context where similarity is determined based on labels of the demonstrations. Considering Parametric Function $$f_{\theta}(d_i^{\alpha},\ d_j^{\beta}) \rightarrow \mathbb{R}^{[0,1]} = p(\alpha = \beta\,|\,d_i^{\alpha},\ d_j^{\beta},\ \theta),$$

where $f_{\theta}$ is the similarity function. The similarity function $f_{\theta}$ is included in an encoder module having the Transformer architecture, as discussed further below. $d_i$ $$d_i^{\alpha}, d_j^{\beta}$$

are two demonstrations being compared. The encoder module takes as input the concatenation of the two demonstrations being compared. Scaled dot attention may be used to match complex sequences.

It may be difficult to determine the similarities between sequences of states of demonstrations without computing interactions between two complex sequences. Scaled dot attention contextualizes the steps of each demonstration independently and also allows contextualization of the pair of demonstrations together. The encoder module may therefore use scale dot attention in determining the similarity values.

The encoder module may determine the similarity values using a Wall model involving determining matching over each complete demonstration. Alternatively, the encoder module may determine the similarity values using a Chunk model trained of contiguous sampled sub-sequence pairs of demonstrations. When using the Chunk model, the overall similarity value between the two demonstrations is computed by integrating over a set of sampled sub-sequences of the query demonstration and the stored demonstration.

The encoder module (having the Transformer architecture) may include a stack of multi-head attention layers associated with batch normalization and fully connected layers.

Examples of tasks include pushing involving displacing an object from an initial position to a goal position with the help of the end-effector of the controlled arm. Pushing includes manipulation tasks like pressing a button or closing a door. Reach is another task and includes displacing the position of the end-effector into a goal position. In some tasks, obstacles may be present in the environment. Pick and Place tasks involve grasping an object and displacing it in a goal position.

Figure 3:
FIG. 3 is a functional block diagram of an example implementation of the model.

FIG. 3 is a functional block diagram of an example implementation of the model 124. While the example of FIG. 3 will be discussed regarding the model 124 including the Transformer architecture, the model 124 may include another suitable type of attention module, such as at least one of a self-attention model and a cross-attention model.

Figure 4:
FIG. 4 is a functional block diagram of an example implementation of a transformer encoder module of the model.

FIG. 4 is a functional block diagram of an example implementation of a transformer encoder module 416 of the model 124. The model 124 includes a multi-headed attention layer or module (in the transformer encoder module 416) including h "heads" which are computed in parallel. Each of the heads performs three linear projections called (1) the key $K=[t]_{1:T}W^K$, (2) the query $Q=[t]_{1:T}W^Q$, and (3) the value $V=[t]_{1:T}W^V$ into dt dimensions:

$$head_i = Att([t]1:TW_i^Q,\ [t]1:TW_i^K;[t]1:TW_i^v)$$

for i={1, . . . , h} and [.]1:T is the row-wise concatenation operator, and where projections are parameter matrices such that $$W_i^q, W_i^K, W_i^Y \in R^{dxd_t}.$$

The three transformations of the individual set of input features are used to compute a contextualized representation of each of the input vectors. The scaled-dot attention applied on each head independently is defined as $$Att(Q,\ K,\ V) = softmax\left(\frac{QK_T}{\sqrt{d_k}}\right)V$$

with the resulting vector defined in a $d_t$-dimensional output space. Each head aims at learning different types of relationships among the input vectors and transforming them. Then, the outputs of each layer are concatenated as head{1, h} and are linearly projected to obtain a contextualized representation of each input, merging all information independently accumulated in each head into M:

$$M=\text{MultiHeadAtt}(Q,K,V)=[\text{head}]_{1:h'}W_O$$

where $W^O \in \mathbb{R}^{h \cdot d_v \times d}$.

The heads of the Transformer architecture allow for discovery of multiple relationships between the input sequences. Examples of PPO (proximal policy optimization) parameters for training are provided below. The present application, however, is applicable to other PPO parameters and/or values.

| Hyper-parameter | Value |
| --- | --- |
| Clipping | 0.2 |
| Gamma | 0.99 |
| Lambda (GAE) | 0.95 |
| Batch size | 4096 |
| Epochs | 10 |
| Learning rate | 3e−4 |
| Learning rate schedule | Linear annealing |
| Gradient norm clipping | 0.5 |
| Entropy coef | 1e−3 |

-continued

| Hyper-parameter | Value |
| --- | --- |
| Vale coef | 0.5 |
| Num. linear layer | 3 |
| Hidden dimension | 64 |
| Activation function | TanH |
| Optimizer | Adam |

The observation and reward running means and variances may be used for normalization as a difference in performance in different environments may occur.

Examples of recurrent model parameters are provided below. The present application, however, is applicable to other recurrent model parameters.

| Hyper-parameter | value |
| --- | --- |
| Learning rate | 5e–4 |
| Batch size | 128 |
| Num. GRU layer | 2 |
| Hidden dimension | 128 |
| Activation function | TanH |
| Dropout | 0.2 |
| Optimizer | Adam |

Example parameters of the transformer encoder module 416 (transformer model parameters) architecture are provided below. The present application, however, is also applicable to other transformer model parameters and/or values.

| Hyper-parameter | value |
| --- | --- |
| Learning rate | 1e–4 |
| Num. head | 8 |
| Num. encoder layer | 4 |
| Num. decoder layer | 4 |
| Feedforward dim | 1024 |
| Batch size | 256 |
| Hidden dim | 64 |
| Activation function | ReLU |
| Dropout | 0.1 |
| Optimizer | AdamW |

An input embedding module 404 embeds a user input demonstration ($d_n$) using an embedding algorithm. Embedding may also be referred to as encoding. A position encoding module 405 generates positional encodings using an encoding algorithm, as discussed further below. An adder module 407 adds the positional encodings to the output of the input embedding module 404. For example, the adder module 407 may concatenate the positional encoding on to a vector output of the input embedding module 404.

Multiple stored demonstrations are stored in a demonstration database 406 in memory. A selection module 408 selects ones of the stored demonstrations for the transformer encoder module 416 to determine a similarity value, as discussed above, reflecting a similarity between the stored demonstration and the user input demonstration.

A concatenation module 412 may concatenate the output of the adder module 407 (including the user input demonstration) with the stored demonstration and input the concatenation to the transformer encoder module 416. The transformer encoder module 416 determines the similarity value based on the concatenation, as discussed above.

An indicator module 420 indicates whether the user input demonstration is the same as the stored demonstration based on the similarity value. For example, the indicator module 420 may indicate that the user input demonstration is the same as the stored demonstration when the similarity value is greater than or equal to a predetermined value (e.g., 0.8 in the example of the similarity values ranging from 0 to 1). The indicator module 420 may indicate that the user input demonstration is not the same as the stored demonstration when the similarity value is less than the predetermined value.

FIG. 4 is a functional block diagram of an example implementation of the transformer encoder module 416. The output of the concatenation module 412 is input to the transformer encoder module 416. Each of the demonstrations may include a set of 6 DoF poses of the end effector, such as a 3 dimensional (3D) position of the end effector and a 3D pose of the end effector.

The transformer encoder module 416 may include a stack of N=6 identical layers. Each layer may have two sub-layers. The first sub-layer may be a multi-head attention mechanism (module) 504 (e.g., self-attention and/or cross-attention), and the second may be a position wise fully connected feed-forward network (module) 508. Addition and normalization may be performed on the output of the multi-head attention module 504 and the concatenation by an additional and normalization module 512. Residual connections may be used around each of the two sub-layers, followed by layer normalization. That is, the output of each sub-layer is LayerNorm (x+Sublayer(x)), where Sublayer(x) is the function implemented by the sub-layer itself.

To facilitate these residual connections, all sub-layers, as well as the embedding layers, may produce outputs of dimension d=512. A similarity module 516 may determine the similarity value for the pair of demonstrations based on the output of the feed forward module 508. An example equation for determining the similarity value is provided above.

Figures 5, 6:
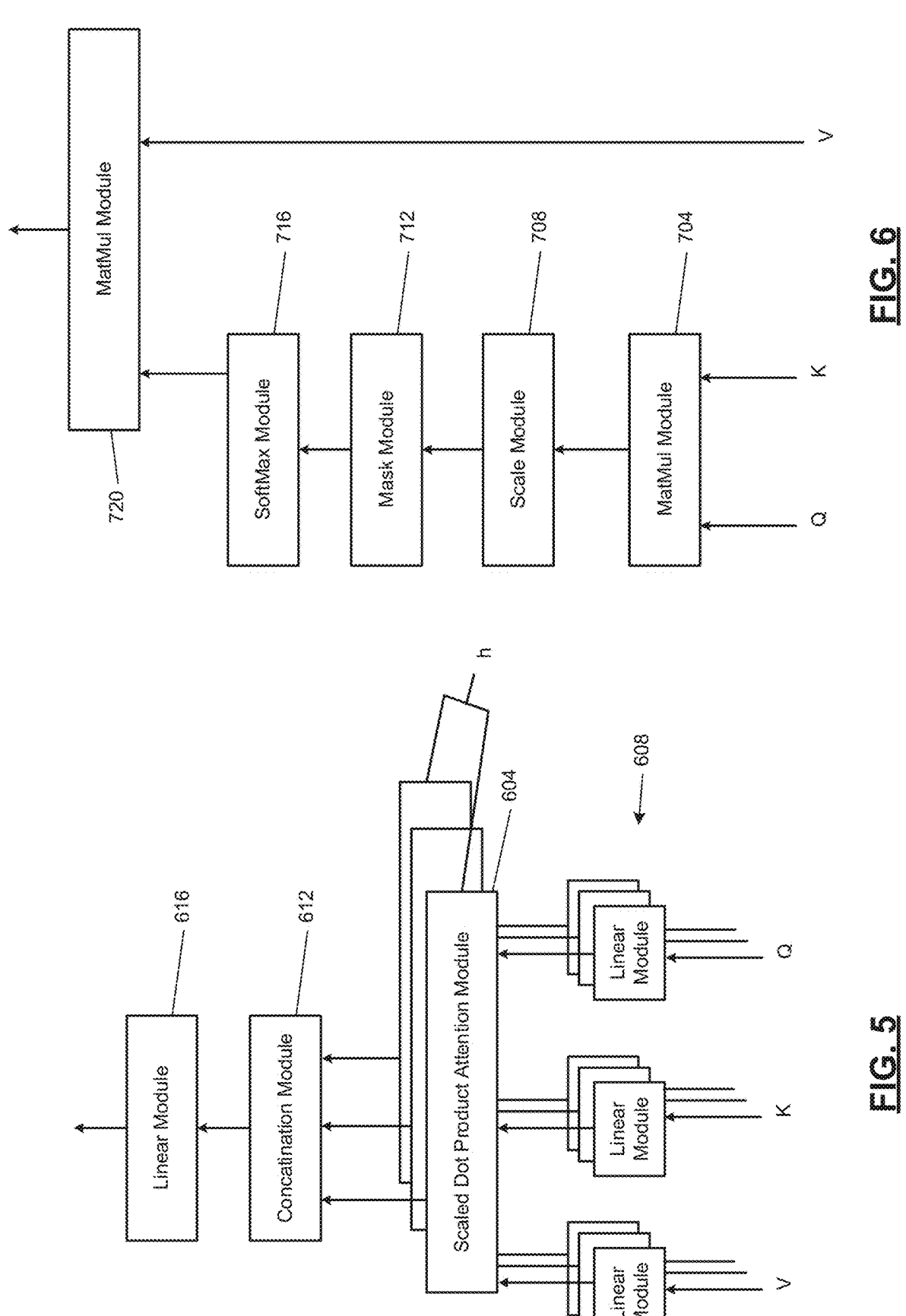
FIG. 5 is a functional block diagram of an example implementation of a multi-head attention module of the transformer encoder module.
FIG. 6 is a functional block diagram of an example implementation of a scaled dot-product attention module of the multi-head attention module.

FIG. 5 includes a functional block diagram of an example implementation of the multi-head attention module 504. FIG. 6 includes a functional block diagram of an example implementation of a scaled dot-product attention module 604 of the multi-head attention module 504.

Regarding attention (performed by the multi-head attention module 504), an attention function may function by mapping a query and a set of key-value pairs to an output, where the query, keys, values, and output are all vectors. The output may be computed as a weighted sum of the values, where the weight assigned to each value is computed by a compatibility function of the query with the corresponding key.

In the scaled dot-product attention module of FIG. 6, the input includes queries and keys of dimension $d_k$, and values of dimension $d_v$. The scaled dot-product attention module 604 computes dot products of the query with all keys, divides each by $\sqrt{d_k}$, and applies a softmax function to obtain weights on the values.

The scaled dot-product attention module 604 may compute the attention function on a set of queries simultaneously arranged in a matrix Q. The keys and values may also be held in matrices K and V. The scaled dot-product attention module 604 may compute the matrix of outputs based on or using the equation:

$$\text{Attention}(Q, VK, V) = softmax\left(\frac{QK^T}{\sqrt{d_k}}\right)V.$$

The attention function may be, for example, additive attention or dot-product (multiplicative) attention. Dot-product attention may be used in addition to scaling using a scaling factor of $$\frac{1}{\sqrt{d_k}}.$$

Additive attention computes a compatibility function using a feed-forward network with a single hidden layer. Dot-product attention may be faster and more space-efficient than additive attention.

Instead of performing a single attention function with d-dimensional keys, values and queries, the multi-head attention module 504 may linearly project the queries, keys, and values h times with different, learned linear projections to $d_k$, $d_q$ and $d_v$ dimensions, respectively, using linear modules 608. On each of the projected versions of queries, keys, and values the attention function may be performed in parallel, yielding $d_v$-dimensional output values. These may be concatenated and projected again, resulting in the final (score) values, by a concatenation module 612 and a linear module 616 as shown.

Multi-head attention allows the model 124 to jointly attend to information from different representation subspaces at different positions. With a single attention head, averaging may inhibit this feature.

$$(Q,\ K,\ V) = Concat(head1,\ \ldots\ ,\ headh)W^O,$$

$$\text{where } headi = \text{Attention}(QW_i^Q,\ KW_i^K,\ VW_i^V),$$

where headi=Attention(QW$_i^Q$, KW$_i^K$, VW$_i^v$), where the projection parameters are matrices $$W_i^Q \in \mathbb{R}^{dxQ},\ W_i^K \in \mathbb{R}^{dxd_k},\ W_i^V \in \mathbb{R}^{dxd_V}\ \text{and}$$

$$W^O \in \mathbb{R}^{hd_vxd}.$$

h may be 8 parallel attention layers or heads. For each, dk=dv=d/h=64.

Multi-head attention may be used in different ways. For example, in the encoder attention layers, the queries come from the previous layer, and the memory keys and values come from the output of the encoder. This may allow every position in the encoder to attend over all positions in the input sequence.

The encoder includes attention layers. In an attention layer all of the keys, values, and queries come from the same place, in this case, the output of the previous layer in the encoder. Each position in the encoder can attend to all positions in the previous layer of the encoder.

Attention layers in the encoder module may be configured to allow each position in the encoder to attend to all positions in the encoder up to and including that position. Leftward information flow may be prevented in the encoder to preserve the auto-regressive property. This may be performed in the scaled dot-product attention by masking out (setting to 1) all values in the input of the softmax which may correspond to illegal connections.

Regarding the position wise feed forward module 508, each may include two linear transformations with a rectified linear unit (ReLU) activation between.

$$FFN(x)=\max(0;xW_1+b_1)W_2+b_2$$

While the linear transformations may be the same across different positions, they use different parameters from layer to layer. This may also be described as performing two convolutions with kernel size 1. The dimensionality of input and output may be d=512, and the inner-layer may have dimensionality d$_{ff}$=2048.

Regarding the embedding and softmax functions of the model 124, learned embeddings may be used to convert input tokens and output tokens to vectors of dimension d. The learned linear transformation and softmax function may be used to convert the decoder output to predicted next-token probabilities. The same weight matrix between the two embedding layers and the pre-softmax linear transformation may be used. In the embedding layers, the weights may be multiplied by $\sqrt{d}$.

Regarding the positional encoding, some information may be injected regarding relative or absolute position of the tokens in a sequence. Thus, the positional encodings may be added to the input embeddings at the bottoms of the encoder stack. The positional encodings may have the same dimension d as the embeddings, so that the two can be added. The positional encodings may be, for example, learned positional encodings or fixed positional encodings. Sine and cosine functions of different frequencies:

$$PE_{(pos,2i)}=\sin(pos/10000^{2i/d})$$

$$PE_{(pos,2i+1)}=\cos(pos/10000^{2i/d})$$

where pos is the position and i is the dimension. Each dimension of the positional encoding may correspond to a sinusoid. The wavelengths form a geometric progression from $2\pi$ to $10000 \times 2\pi$. Additional information regarding the transformer architecture can be found in U.S. Pat. No. 10,452,978, which is incorporated herein in its entirety.

As shown in FIG. 6, a MatMul module 704 generates an output based on the query Q and key K values using the MatMul function. A scale module 708 may scale the output of the MatMul module 704 by one or more predetermined scalar values. A mask module 712 may mask one or more portions of the output of the scale module 708 to produce an output. In various implementations, the mask module 712 may be omitted.

A SoftMax module 716 may apply the softmax function to the output of the mask module 712. A MatMul module 720 generates an output to the concatenation module 612 based on the output of the SoftMax module 716 and the value V using the MatMul function.

Figure 7:
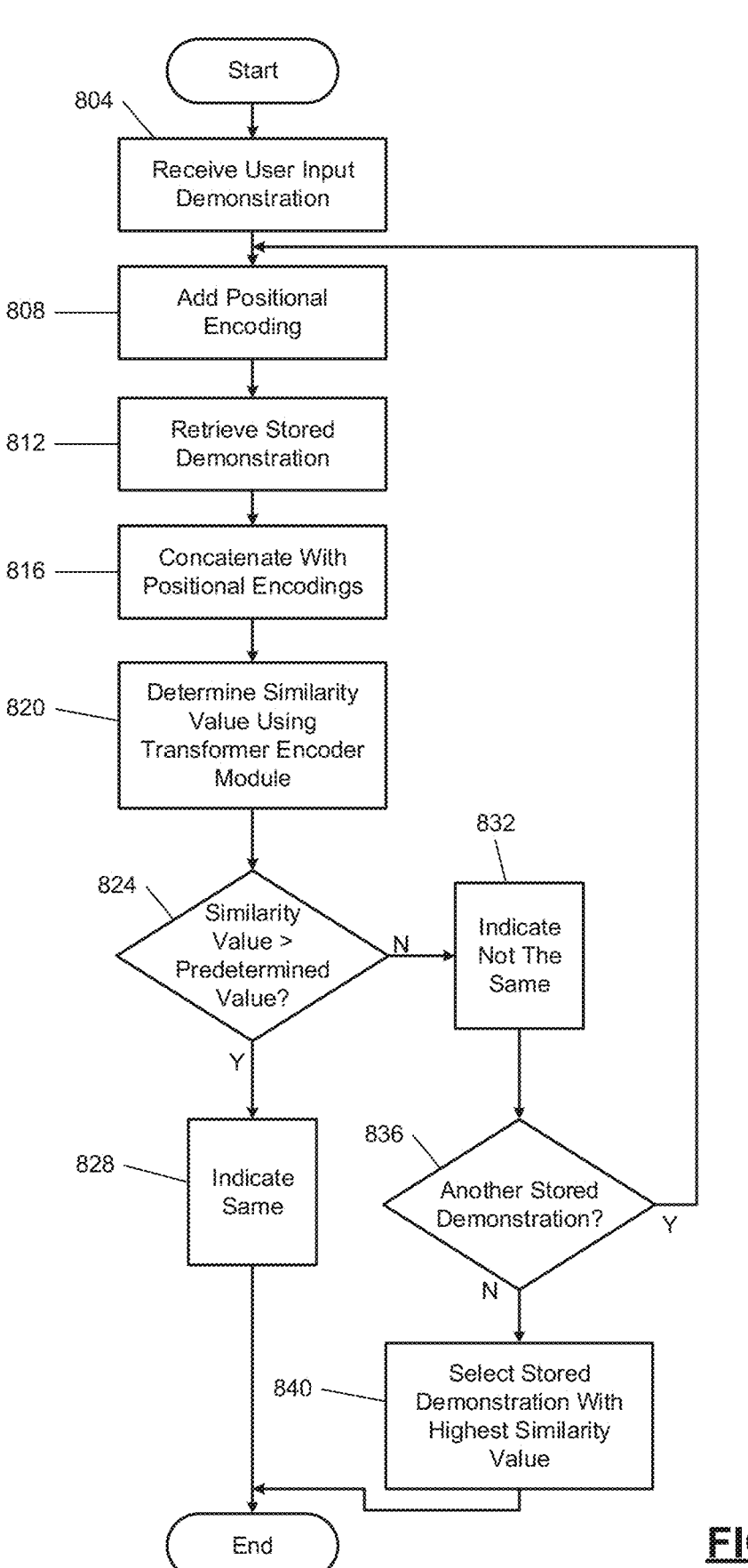
FIG. 7 is a flowchart depicting an example method of retrieving and identifying similarity between stored demonstrations of a robot and a user input demonstration for the robot.
Figure 8A:
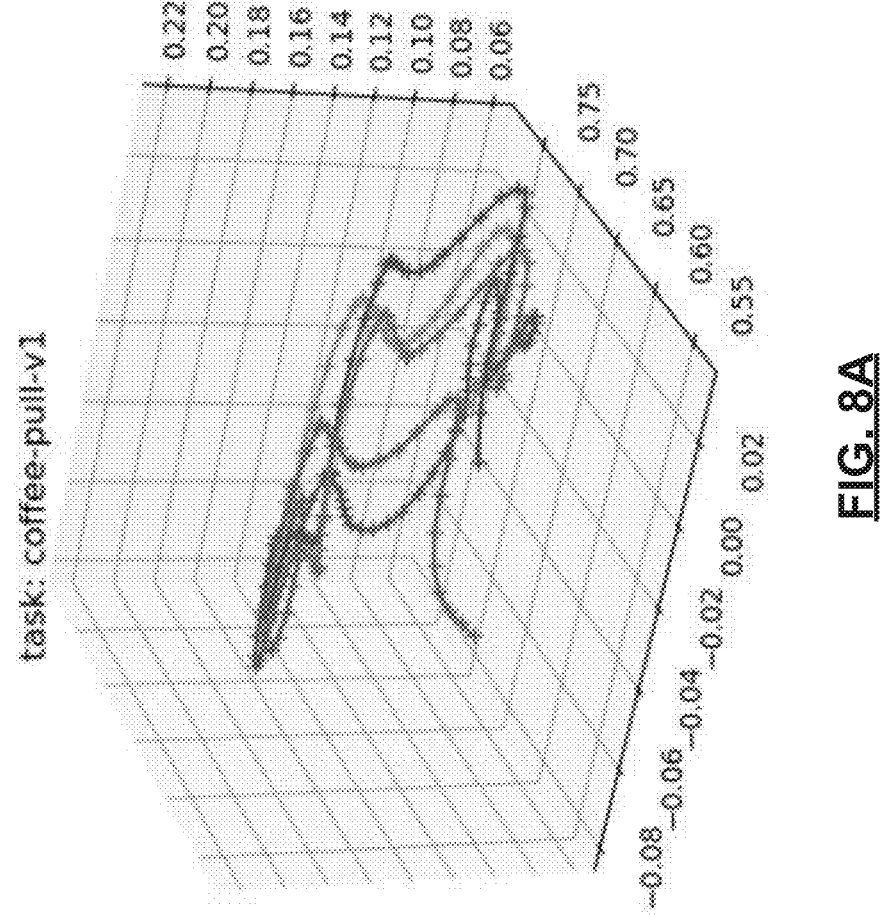
FIGS. 8A-8I include example graphs of end effector trajectories of poses in demonstrations for different tasks.
Figure 8B:
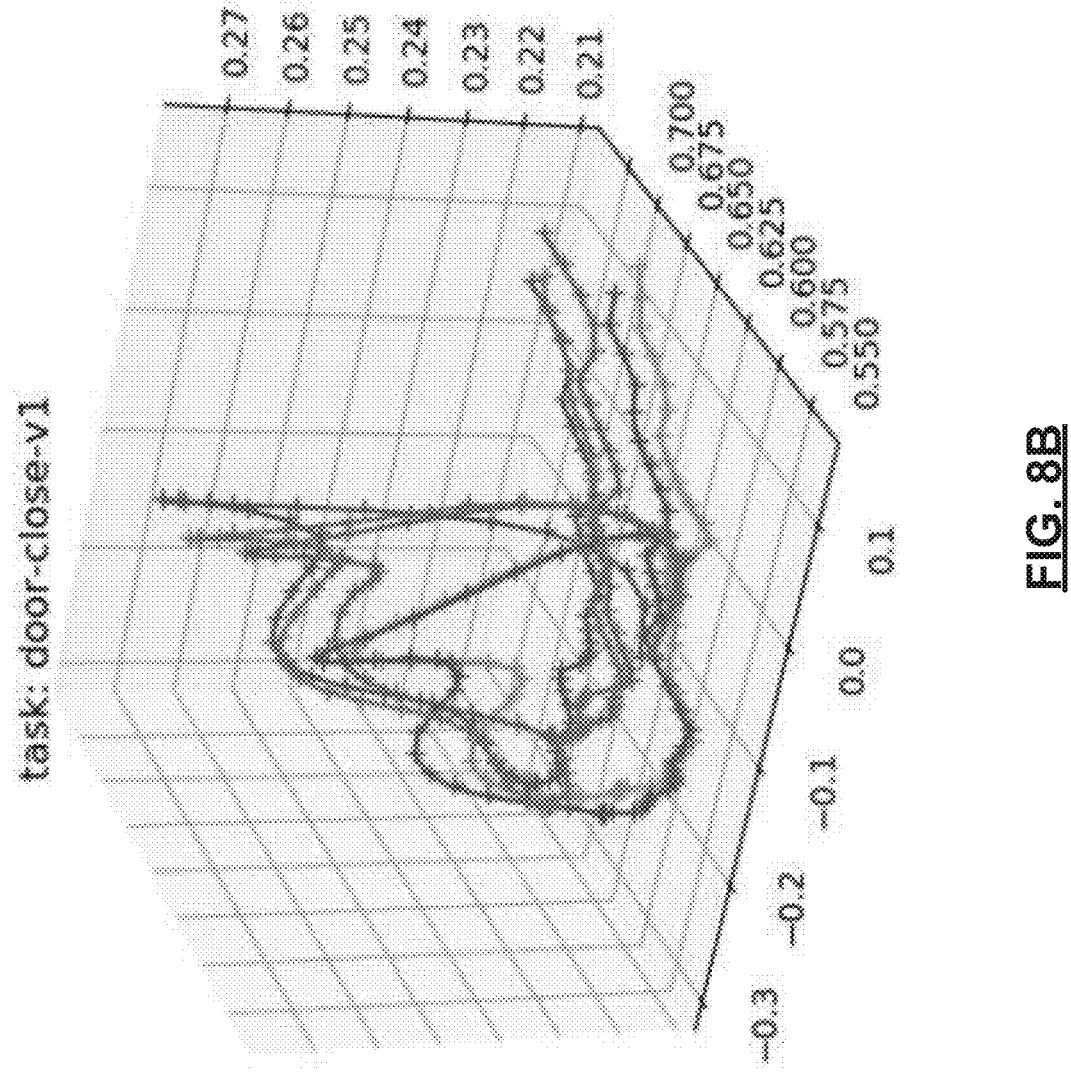
Figure 8C:
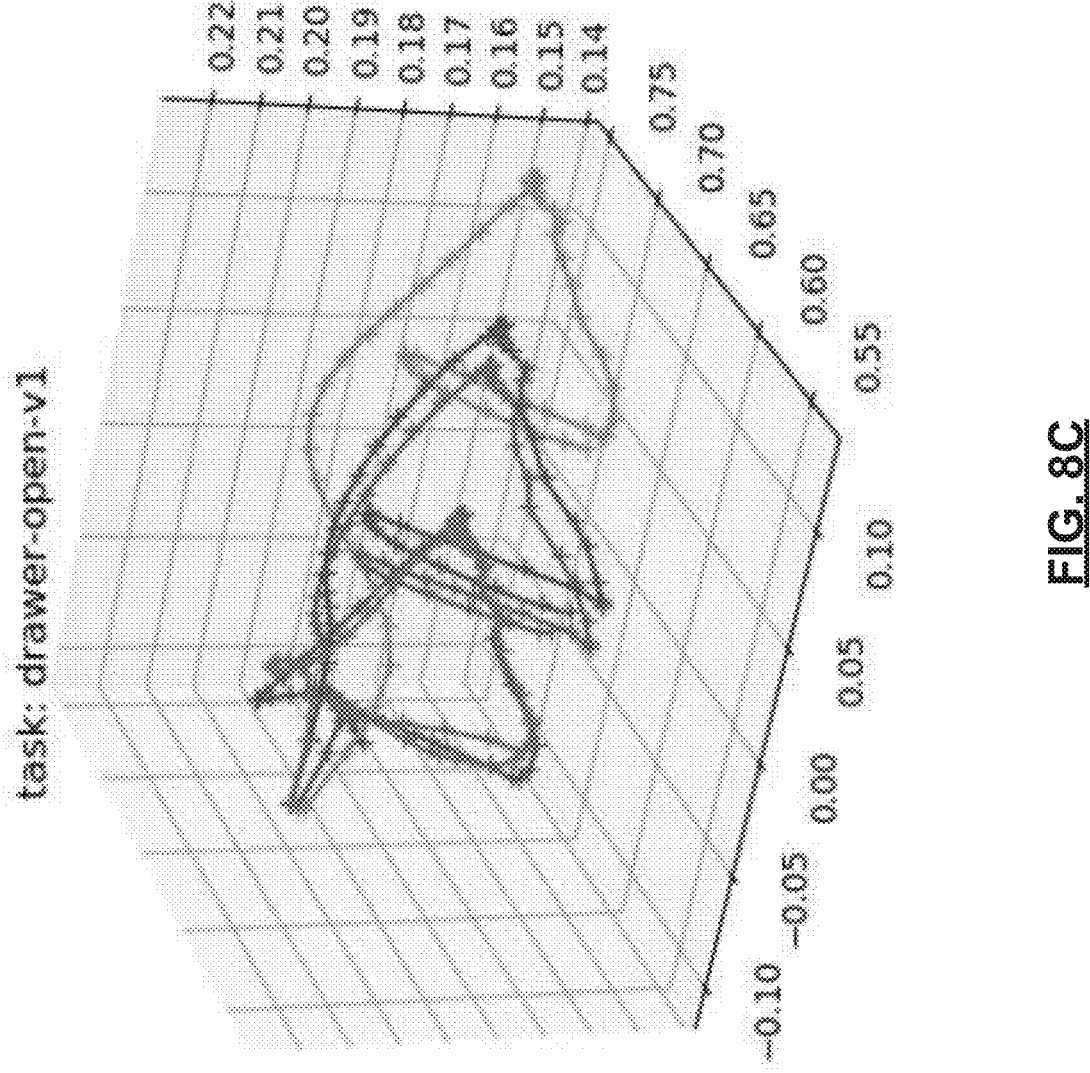
Figure 8D:
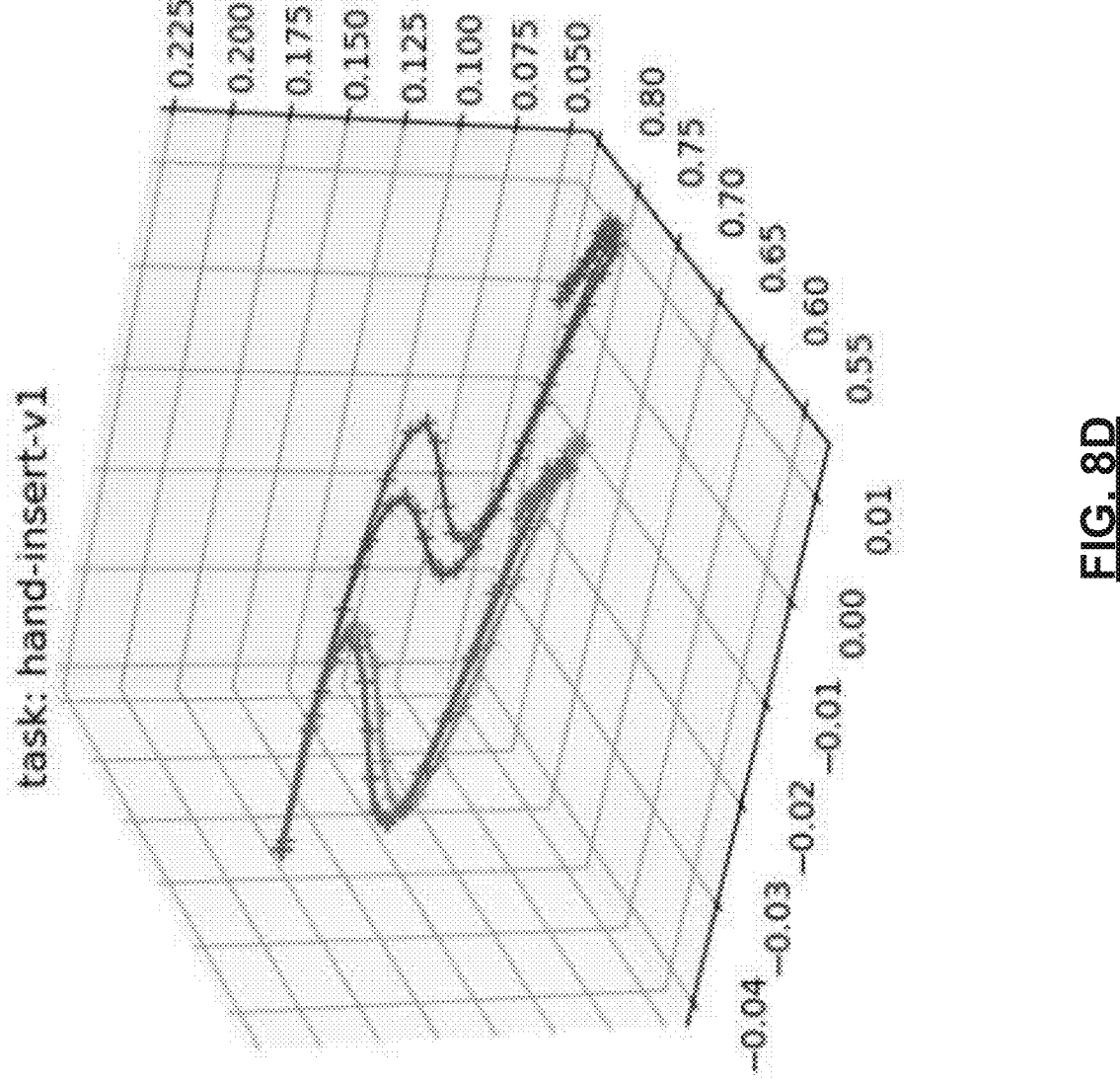
Figure 8E:
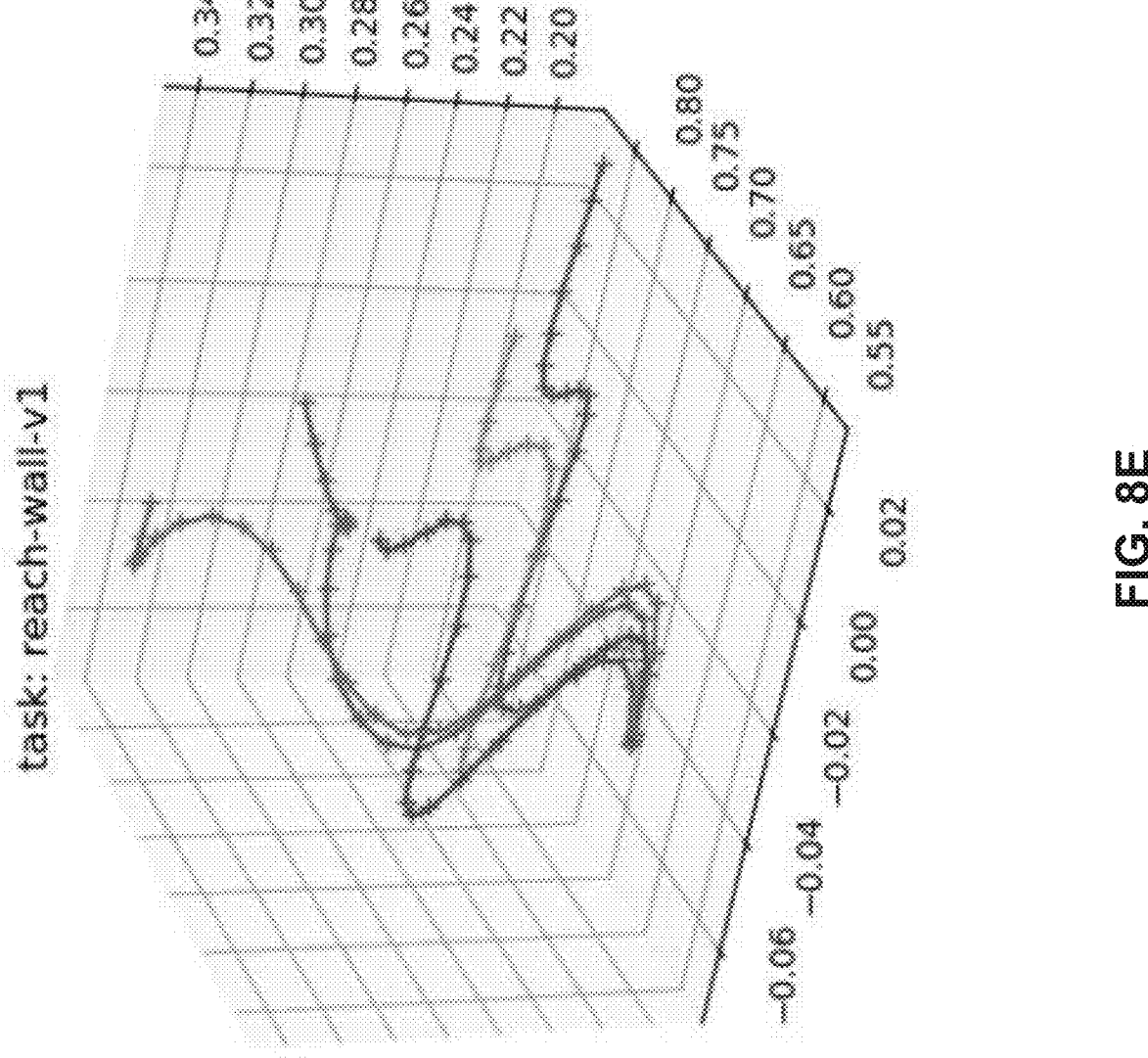
Figure 8F:
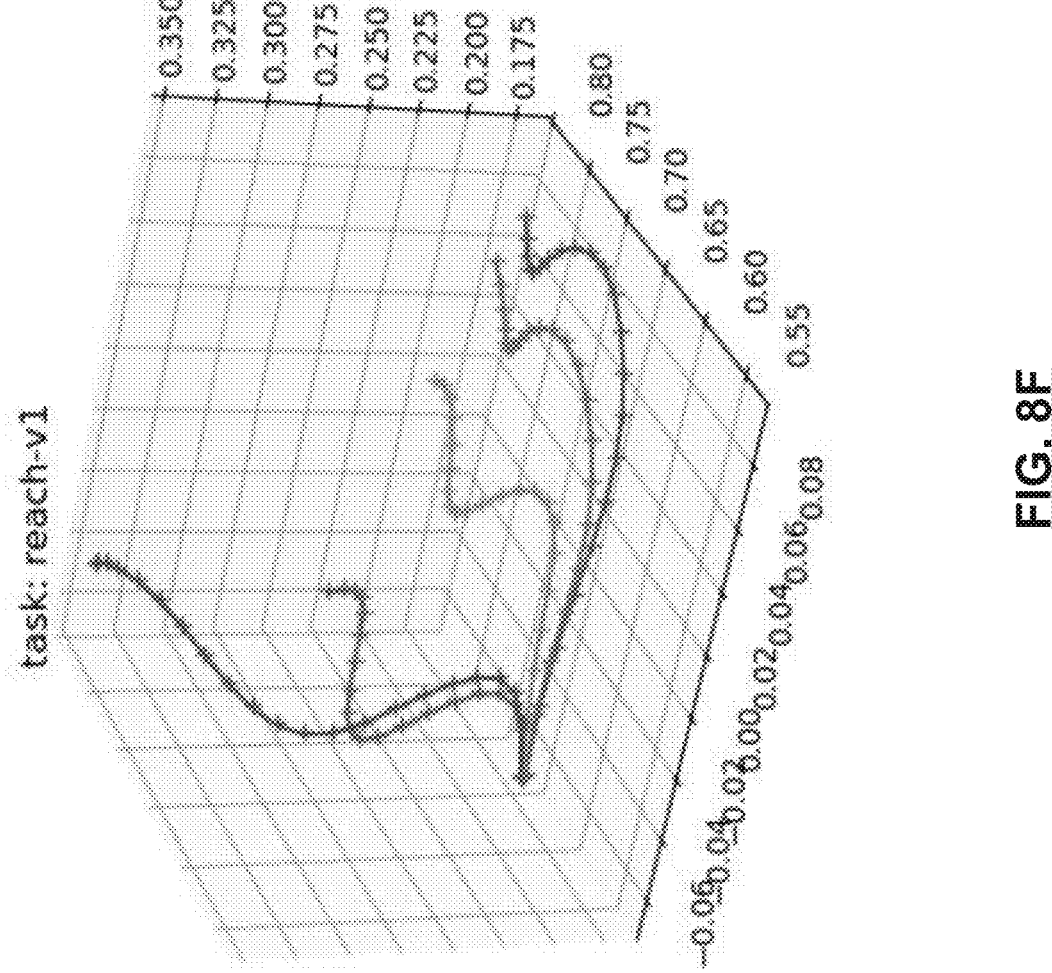
Figure 8G:
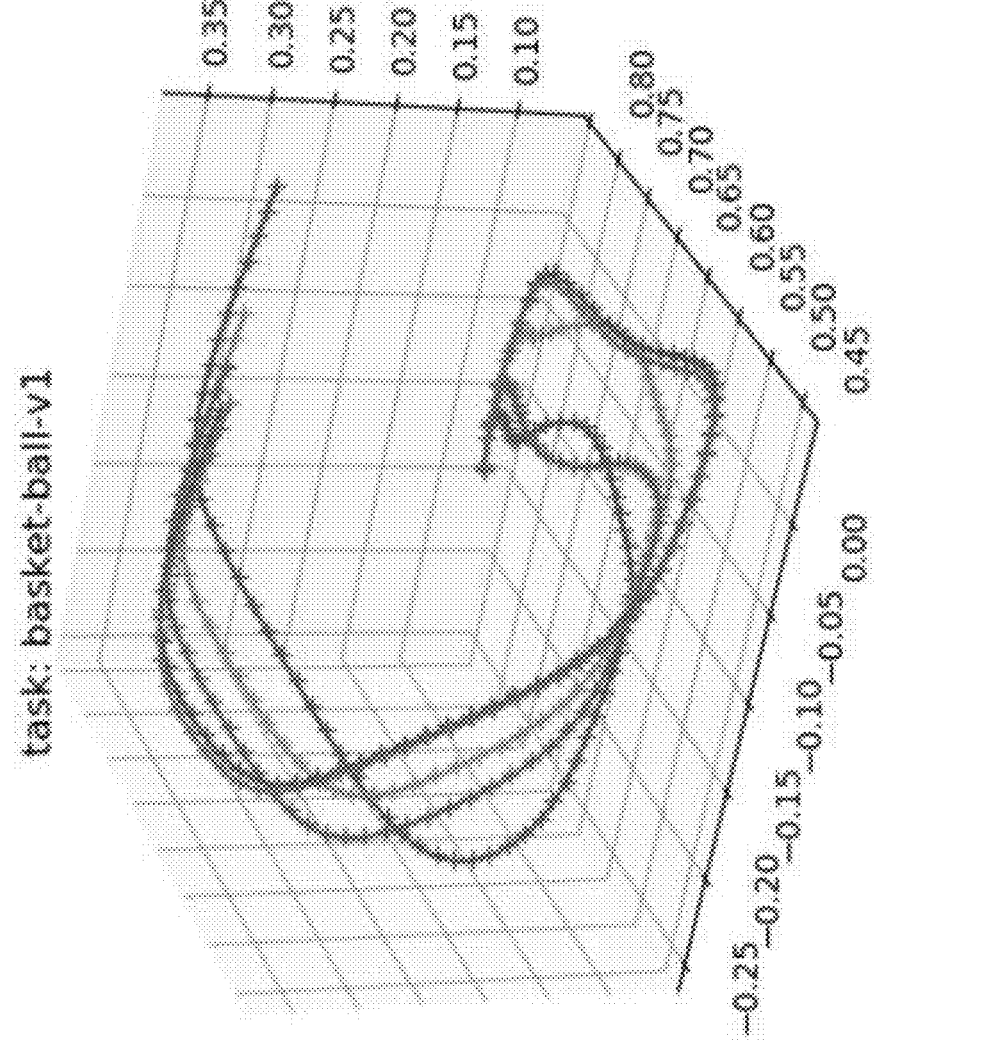
Figure 8H:
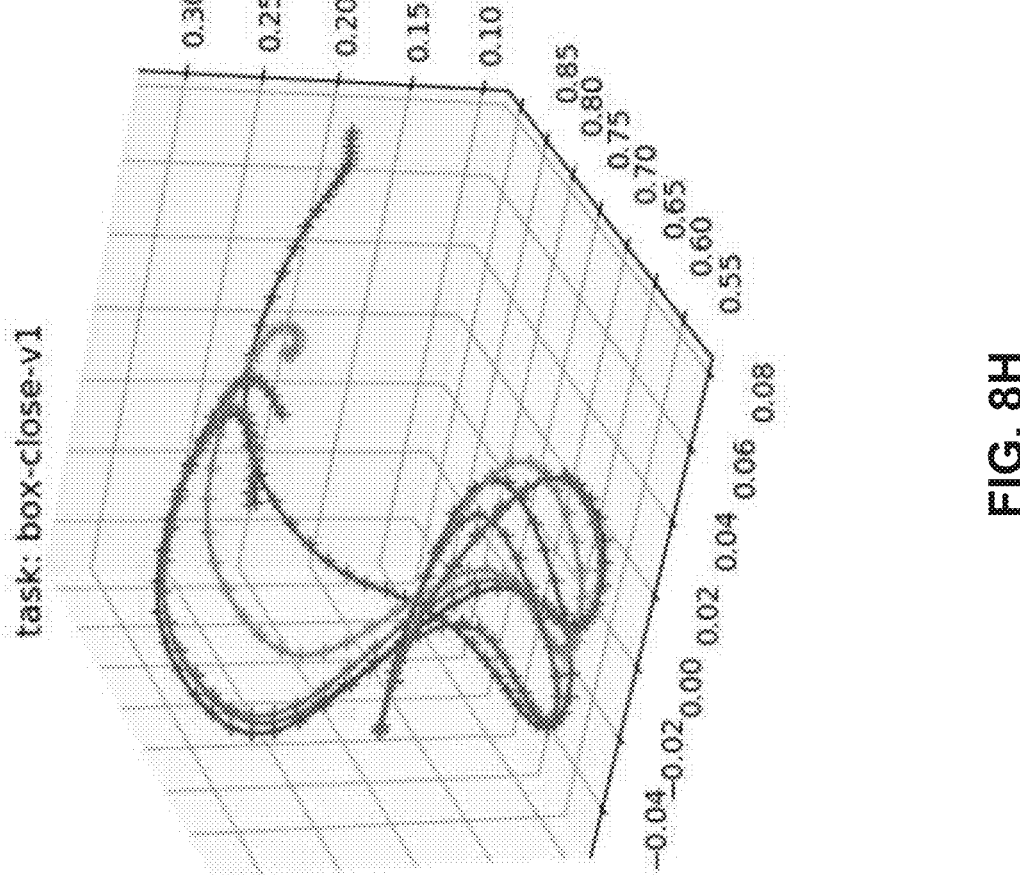
Figure 8I:
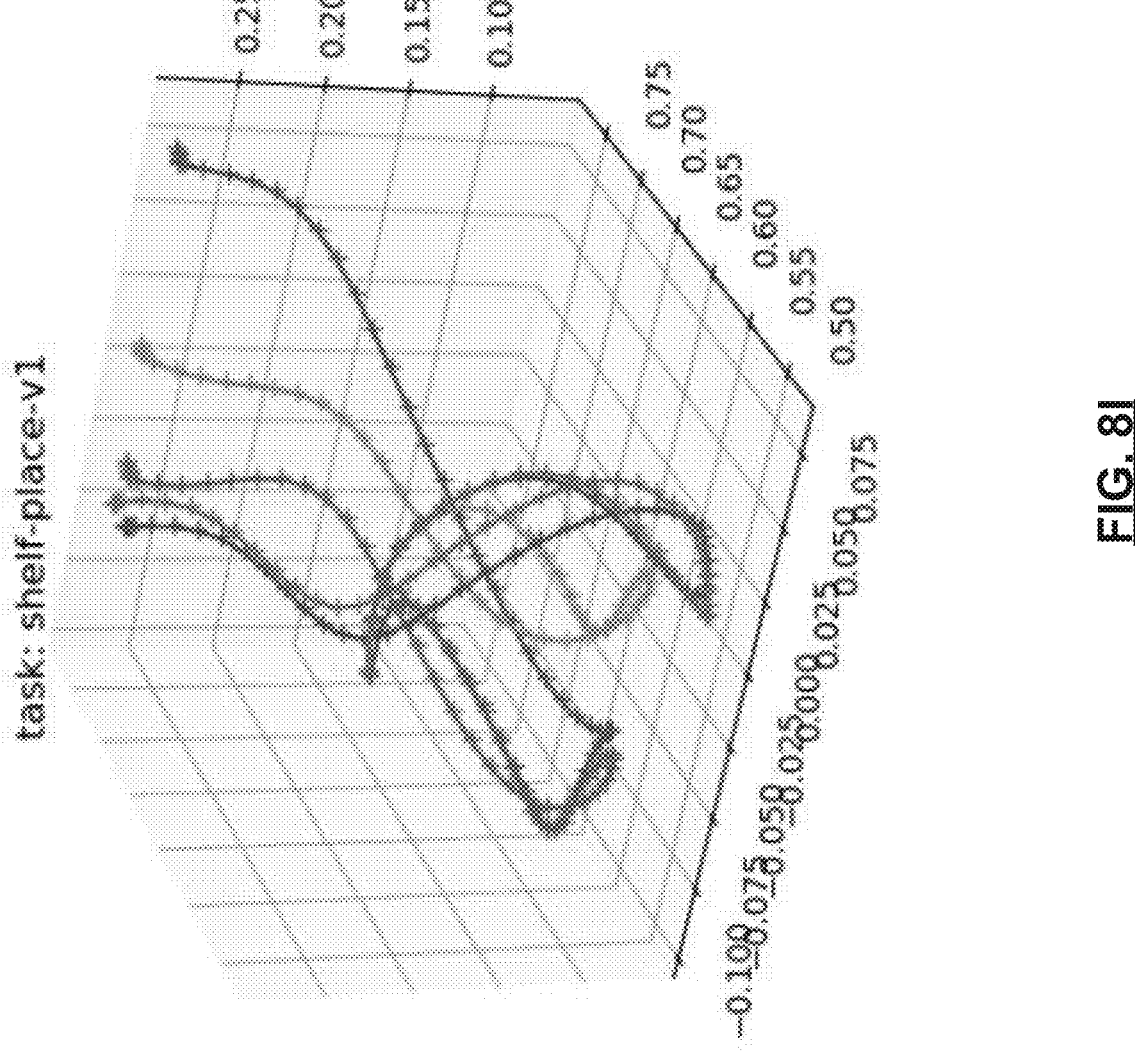

FIG. 7 is a flowchart depicting an example method of retrieving and identifying similarity between stored demonstrations and a user input demonstration. Control begins with 804 where the model 124 receives a user input demonstration. At 808, position encoding module 405 generates the positional encoding, and the adder module 407 adds the positional encoding to the output of the input embedding module 404.

At 812, the selection module 408 selects a stored demonstration from the demonstration database 406, such as randomly or in a predetermined order. At 816, the concatenation module 412 concatenates the output of the adder module 407 with the stored demonstration selected by the selection module 408. At 820, the transformer encoder module 416 including the Transformer architecture determines the similarity value based on the output of the concatenation module 412.

At 824, the indicator module 420 compares the similarity value with the predetermined value and determines whether the similarity value is greater than the predetermined value.

If 824 is true, the indicator module 420 may indicate that the stored demonstration is the same as the user input demonstration at 828. If 824 is false, the indicator module 420 may indicate that the stored demonstration is not the same as the user input demonstration at 832. Control may end after 828 or 832. Alternatively, control may proceed with 836 after 832.

At 836, the selection module 408 may determine whether another (different) one of the stored demonstrations could be selected. If 836 is true, the selection module 408 may store a different one of the stored demonstrations from the demonstration database 406, and control may return to 808. In this manner, different stored demonstrations may be selected and assessed for similarity until the similarity value that is In comparison, the MIPS strategy appears to less efficiently capture the necessary information for accurate retrieval. For the example of inner-category evaluation, the gap in results is less important over the models. A significant difference can be noticed for the inter-category evaluation. As an example, the push/push to place is particularly better in the case of the Transformer based model. The results also illustrate that the Chunk model/approach provides better results. For these results, integration over 5 sampled subsequences of each given pair of sequences was used at test time.

|  |  | Push | | | Place | | | Reach | | |
|---|---|---|---|---|---|---|---|---|---|---|
|  |  | Transform. | LSTM | MIPS | Transform. | LSTM | MIPS | Transform. | LSTM | MIPS |
| Chunk | push/push | 1.0 | 0.92 | 0.82 | 0.90 | 0.84 | 0.76 | 0.79 | 0.67 | 0.61 |
|  | push/place | 0.79 | 0.71 | 0.63 | 0.93 | 0.84 | 0.77 | 0.82 | 0.75 | 0.69 |
|  | place/place | 0.86 | 0.78 | 0.64 | 0.82 | 0.74 | 0.66 | 0.79 | 0.70 | 0.61 |
| Wall | push/push | 1.0 | 0.93 | 0.78 | 0.83 | 0.79 | 0.68 | 0.78 | 0.72 | 0.64 |
|  | push/place | 0.81 | 0.76 | 0.69 | 0.93 | 0.87 | 0.81 | 0.86 | 0.79 | 0.71 |
|  | place/place | 0.99 | 0.89 | 0.78 | 0.84 | 0.72 | 0.63 | 0.91 | 0.86 | 0.81 | greater than the predetermined value is found. If 836 is false, all of the stored demonstrations have been assessed, and the stored demonstration having the highest (greatest) similarity value may be selected at 840.

One or more actions may be taken based on the stored demonstration that is the same or has the highest similarity value. For example, the control module 120 may actuate one or more of the actuators 116 based on the stored demonstration any one or more adjustments made based on the user input demonstration.

Demonstrations may be gathered by sampling Proximal Policy Optimization-trained policies (PPO) over each of the 50 individual tasks trained on a training dataset, such as the MetaWorld environment. The user tasks are defined using demonstrations defined as the 6 degrees of freedom pose of the end effector of the robot. The model 124 may be trained using this dataset as each demonstration is associated with a unique task. Example parameters of PPO training are provided above. Example tasks include push, reach, and pick-place.

Table 1 below includes test results obtained for the Chunk and the Wall approaches over the three considered similarity models. The generalization capability of each model for different tasks may be assessed, splitting the training dataset for train, validation, and test based on task categories. One type of task (e.g., reach tasks) may not be used for training and validating, but used for testing.

As a first baseline, LSTM encoding may be used over the concatenated sequence of the stored demonstration and user input demonstration. In this case, the last output state of the LSTM may be used by the transformer encoder module 416 as a similarity metric (value). As a second baseline, Maximum Inner Product Search (MIPS) includes computing independent encodings of each input demonstrations and defining the similarity value as a dot-product over the two resulting demonstrations. In this second baseline, each sequence is transformed by an LSTM, and the last hidden state is used as a representation for computing the resulting dot-product between the pair of sequences. The Transformer-based retrieval model described herein is the most efficient.

Described above is an attention (e.g., cross and/or self-attention) based retrieval model for robotic demonstrations. The model 124 trained and as described above is able to retrieve stored similar demonstrations in the case of unseen tasks for demonstrations of the same and different categories.

FIGS. 8A-8I include example graphs of end effector trajectories of poses in demonstrations for different tasks.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A robot system comprising:
one or more processors; and
memory including code that, when executed by the one or more processors, performs to:
select a stored demonstration for a robot from a database of stored demonstrations for different tasks of the robot;
using an encoder of an attention model, determine a similarity value reflecting a similarity between:
a user input demonstration for the robot; and
the selected one of the stored demonstrations for the robot;
wherein the similarity value is determined based on masking one or more scaled outputs and generating a concatenation based on the user input demonstration and the selected one of the stored demonstrations;
indicate whether the selected one of the stored demonstrations corresponds to the user input demonstration and belongs to the same task based on the similarity value; and
actuate actuators of the robot based on a policy trained using the stored demonstration output for augmenting training of the policy, wherein the encoder is trained using a training dataset of training demonstrations and a listwise loss over concatenated pairs of training demonstrations, wherein each of the concatenated pairs of training demonstrations are based on a task identifier associated with each training demonstration, the training demonstrations each including a temporal sequence of observation-action tuples of successive behaviors for tasks.

2. The robot system of claim 1 wherein the code, when executed by the one or more processors, performs to indicate that the selected one of the stored demonstrations corresponds to the user input demonstration and belongs to the same task when the similarity value is greater than a predetermined value.

3. The robot system of claim 2 wherein the code, when executed by the one or more processors, performs to output the selected one of the stored demonstrations for augmenting training of the policy for the task in response to a determination that the user input demonstration belongs to the same task as the selected one of the stored demonstration.

4. The robot system of claim 2 wherein the code, when executed by the one or more processors, performs to indicate that the selected one of the stored demonstrations does not correspond to the user input demonstration when the similarity value is less than the predetermined value.

5. The robot system of claim 1 wherein:

the selected one of the stored demonstration includes a first time series of at least 6 degree of freedom (DoF) poses of an end effector of the robot; and the user input demonstration includes a second time series of at least 6 DoF poses of an end effector of the robot.

6. The robot system of claim 1 wherein the encoder includes a stack of 6 identical layers.

7. The robot system of claim 6 wherein each of the six identical layers includes a first sub-layer and a second sub-layer.

8. The robot system of claim 7 wherein the first sublayers perform multi-head attention.

9. The robot system of claim 8 wherein the multi-head attention includes performing scaled dot product attention.

10. The robot system of claim 7 wherein the second sublayers define a position wise fully connected feed forward network.

11. The robot system of claim 7 wherein the six identical layers include residual connections around the first and second sub-layers.

12. The robot system of claim 1 wherein the code, when executed by the one or more processors, performs to:

select a second one of the stored demonstrations for the robot from the database of stored demonstrations in response to a determination that the selected one of the stored demonstrations does not correspond to the user input demonstration;

determine a second similarity value reflecting a second similarity between:

the user input demonstration for the robot; and the second one of the stored demonstrations for the robot; and indicate whether the second one of the stored demonstrations corresponds to the user input demonstration and belongs to the same task based on the second similarity value.

13. The robot system of claim 1 wherein the encoder has a Transformer architecture.

14. The robot system of claim 1 wherein the code, when executed by the one or more processors, performs to determine one or more other ones of the stored demonstrations associated with the selected one of the stored demonstrations in response to the determination that the one or more other stored demonstrations corresponds to the user input demonstration and belong to the same task.

15. The robot system of claim 14 wherein the code, when executed by the one or more processors, further performs to actuate actuators of the robot based on the policy trained using the one or more other ones of the stored demonstrations in response to a determination that the one or more other ones of the stored demonstrations are the same as the user input demonstration and belong to the same task.

16. A method for operating a robot system, the method comprising:

selecting a stored demonstration for a robot from a database of stored demonstrations for different tasks of the robot;

determining, using an attention model, a similarity value reflecting a similarity between:

a user input demonstration for the robot; and one or more of the stored demonstrations for the robot;

wherein the determining the similarity value includes determining the similarity value based on masking one or more scaled outputs and generating a concatenation based on the user input demonstration and the selected one of the stored demonstrations;

producing an output indicating whether the one or more stored demonstrations correspond to as the user input demonstration and belong to the same task based on the similarity value; and actuating actuators of the robot based on a policy trained using the selected one of the stored demonstrations output for augmenting training of the policy, wherein the attention model is trained using a training dataset of training demonstrations and a listwise loss over concatenated pairs of training demonstrations, wherein each of the concatenated pairs of training demonstrations are based on a task identifier associated with each training demonstration, the training demonstrations each including a temporal sequence of observation-action tuples of successive behaviors for tasks.

17. The method of claim 16 wherein the producing the output further includes producing an output that indicates that the one or more stored demonstrations correspond to the user input demonstration and belong to the same task when their similarity value is greater than a predetermined value.

18. The method of claim 17 further comprising outputting the one or more stored demonstrations for augmenting training of the policy for the task in response to a determination that the user input demonstration belongs to the same task as the selected one of the stored demonstrations.

19. The method of claim 17 wherein the producing the output further includes producing an output that indicates that the one or more stored demonstrations do not correspond to the user input demonstration when their similarity value is less than the predetermined value.

20. The method of claim 16 further comprising training the attention model using the training dataset of training demonstrations and a listwise loss.

21. The method of claim 19 further comprising:

determining one or more other stored demonstrations associated with the one or more stored demonstrations in response to the determination that the one or more stored demonstrations correspond to the user input demonstration and belongs to the same task; and actuating the actuators of the robot further based on the one or more other stored demonstrations.

22. The method of claim 19 further wherein:

the one or more stored demonstrations include a first time series of at least 6 degree of freedom (DoF) poses of an end effector of the robot; and the user input demonstration includes a second time series of at least 6 DoF poses of an end effector of the robot.

23. A method for operating a robot system comprising:

obtaining a trained policy stored in a memory; and actuating actuators of a robot using the trained policy thereby performing a task defined by one or more user input demonstrations; and wherein the trained policy includes a trained attention model that is trained using a training dataset of training demonstrations and a listwise loss over concatenated pairs of training demonstrations, wherein each of the concatenated pairs of training demonstrations are based on a task identifier associated with each training demonstration, the training demonstrations each including a temporal sequence of observation-action tuples of successive behaviors for tasks, and wherein the training dataset of demonstrations, which includes the one or more user input demonstrations for the robot, and which is used to train the trained policy for actuating the actuators of the robot, is augmented with one or more stored demonstrations for the robot when the stored demonstrations are determined to correspond to the one or more user input demonstration and belong to the same task when their similarity values are greater than a predetermined value, the augmenting including masking one or more scaled outputs and generating a concatenation based on the one or more user input demonstrations and the one or more stored demonstrations.

24. A robot system comprising:

a first circuit configured to select a stored demonstration for a robot from a database of stored demonstrations for different tasks of the robot;

a second circuit configured to determine, using an attention model, a similarity value reflecting a similarity between:

a user input demonstration for the robot; and the selected one of the stored demonstrations for the robot;

wherein the determining the similarity value includes determining the similarity value based on masking one or more scaled outputs and generating a concatenation based on the user input demonstration and the selected one of the stored demonstrations;

a third circuit configured to indicate whether the selected one of the stored demonstrations corresponds to the user input demonstration and belongs to the same task based on the similarity value; and a fourth circuit configured to actuate actuators of the robot based on a policy trained using the selected one of the stored demonstrations output for augmenting training of the policy, wherein the attention model is trained using a training dataset of training demonstrations and a listwise loss over concatenated pairs of training demonstrations, wherein each of the concatenated pairs of training demonstrations are based on a task identifier associated with each training demonstration, the training demonstrations each including a temporal sequence of observation-action tuples of successive behaviors for tasks.

\*  \*  \*  \*  \*